Jan. 27, 1959  E. ORSHANSKY, JR  2,870,721
HYDRODYNAMIC APPARATUS USING INCLINED PLATES
Filed Feb. 25, 1954  5 Sheets-Sheet 1

INVENTOR.
ELIAS ORSHANSKY, JR.
BY
Flam and Flam
ATTORNEYS.

Jan. 27, 1959 E. ORSHANSKY, JR 2,870,721
HYDRODYNAMIC APPARATUS USING INCLINED PLATES
Filed Feb. 25, 1954 5 Sheets-Sheet 2

INVENTOR.
ELIAS ORSHANSKY, JR.
BY
Flam and Flam
ATTORNEYS.

Jan. 27, 1959   E. ORSHANSKY, JR   2,870,721
HYDRODYNAMIC APPARATUS USING INCLINED PLATES
Filed Feb. 25, 1954   5 Sheets-Sheet 3

INVENTOR.
ELIAS ORSHANSKY, JR.
BY
Flam and Flam
ATTORNEYS.

Jan. 27, 1959 — E. ORSHANSKY, JR — 2,870,721
HYDRODYNAMIC APPARATUS USING INCLINED PLATES
Filed Feb. 25, 1954 — 5 Sheets-Sheet 4

INVENTOR.
ELIAS ORSHANSKY, JR.
BY
Flam and Flam
ATTORNEYS.

Jan. 27, 1959 E. ORSHANSKY, JR 2,870,721
HYDRODYNAMIC APPARATUS USING INCLINED PLATES
Filed Feb. 25, 1954 5 Sheets-Sheet 5

INVENTOR.
ELIAS ORSHANSKY, JR.
BY
Flam and Flam
ATTORNEYS.

United States Patent Office 2,870,721
Patented Jan. 27, 1959

2,870,721

HYDRODYNAMIC APPARATUS USING INCLINED PLATES

Elias Orshansky, Jr., Pasadena, Calif., assignor, by mesne assignments, to The New York Air Brake Company, New York, N. Y., a corporation of New Jersey Application February 25, 1954, Serial No. 412,408

7 Claims. (Cl. 103—162)

This invention relates to liquid pumps or motors.

A type of apparatus utilizable for these purposes includes reciprocating pistons operating in cylinder spaces that have axes parallel to the axis of the rotary drive, and disposed in annular fashion with respect to that axis. In order to reciprocate the pistons, inclined plates are provided, often referred to as wobble plates, the plane of inclination being oblique to the drive axis and to the cylinder axes. By relative angular motion between the plate and the cylinder spaces about the main axis of drive, each piston is moved through a reciprocating cycle.

It is one of the objects of this invention to improve in general, this type of hydrodynamic apparatus.

It is often required, as for airplane installations, to utilize liquid pressures of several thousand pounds per square inch. The forces produced by this fluid pressure, along the axes of the cylinders correspondingly attain high values, which, in prior devices of this character, are sustained by thrust bearings of the rolling type. Large, expensive bearing structures are thus rendered essential. Since weight and size are of paramount concern for airplane installations, it is important to be able to reduce the size of these bearings.

It is another object of this invention therefore, to minimize these thrust loads, and thereby to make it possible to provide bearings of the radial type and of relatively small size.

Although these advantageous results are of special concern in connection with aircraft installations, they are not limited to such applications. For example, the same general principles can be profitably employed for such purposes as power steering for automotive vehicles, where the liquid pressures are less, but where economy of cost and space is still an important factor.

It is still another object of this invention to simplify the machining of the parts, whereby close tolerances may be obtained without difficulty.

In the present instance, when operating as a pump, the cylinder block is rotated, and the inclined plates are not power rotated. Due to the fluid pressure forces, there is a tendency for the cylinder block to cock about an axis normal to the axis of rotation. It is still another object of this invention to neutralize substantially the torque couples that would produce the cocking.

It is still another object of this invention to provide a simple and effective mechanism for varying the displacement of the pump.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

In the present instance the apparatus is shown as utilized for pumping liquids. It may as well be utilized as a motor by appropriate changes in the direction of rotation or by the choice of inlet or outlet ports.

That portion of the apparatus which is rotated by power has an axis of rotation 1. An integral rotary cylinder block is provided which comprises a left-hand portion 2 and a right-hand portion 3.

Figures 1, 2, 3:
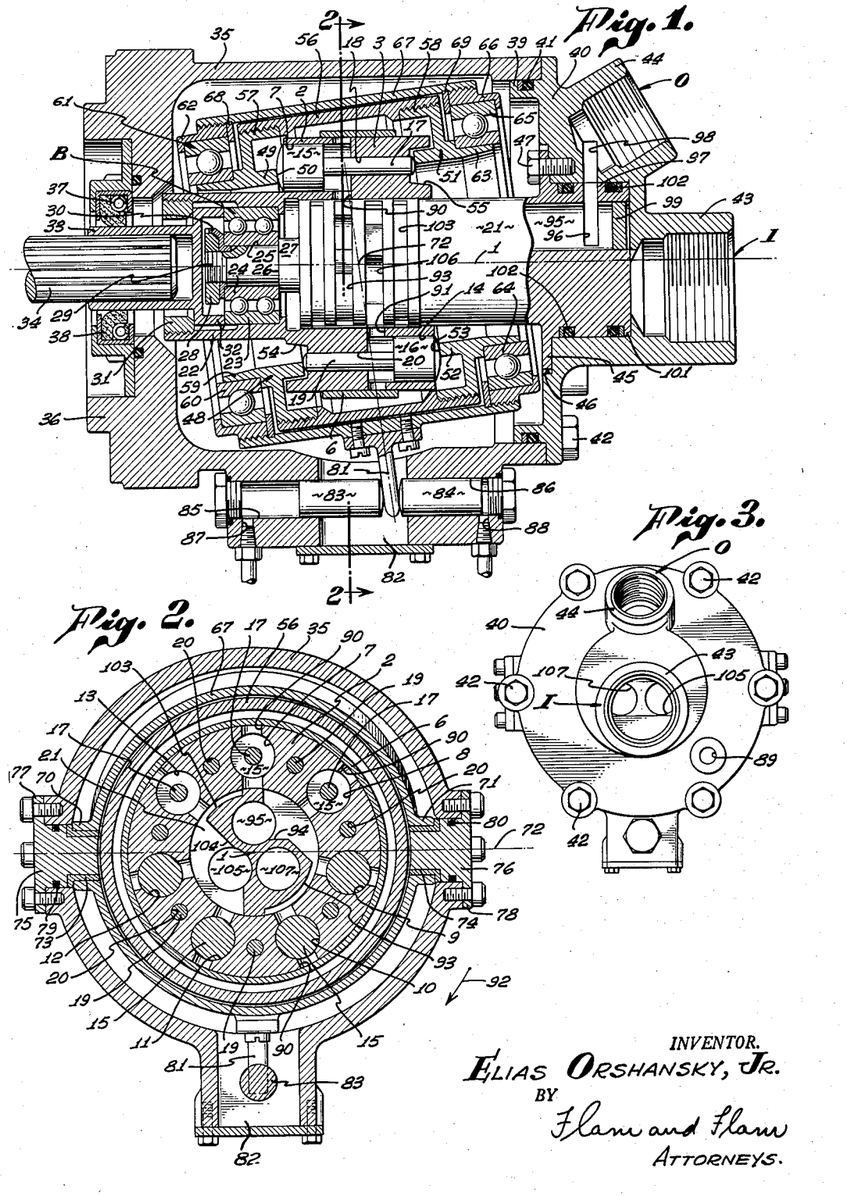
Figure 1 is a longitudinal vertical sectional view of one form of hydrodynamic apparatus incorporating the invention.
Fig. 2 is a cross sectional view, taken along a plane corresponding to line 2—2 of Fig. 1.
Fig. 3 is an end view, taken from the right hand side of Fig. 1.

As shown most clearly in Fig. 2, the block 2—3 has a series of cylinder spaces 7, 8, 9, 10, 11, 12, and 13. These seven cylinder spaces have axes parallel to the axis 1, and are equidistantly and equi-angularly spaced about that axis. All of these cylinder spaces 7 to 13 open toward the left-hand side of the cylinder block.

Similarly, cylinder block 2—3 is provided with other cylinder spaces, one of which is indicated by reference character 14 in Fig. 1, all opening toward the right-hand side of the cylinder block. These cylinder spaces in the block 2—3 are also disposed on axes parallel to the axis 1 but at angular positions such that they are respectively diametrically opposite the cylinder spaces 7 to 13 inclusive.

There are accordingly seven cylinder spaces facing toward the left and seven cylinder spaces facing toward the right, as viewed in Fig. 1; these cylinder spaces alternating and one set being equiangularly spaced from the other.

Piston structures are provided in each of the cylinder spaces. These piston structures are exemplified by the piston 15 in cylinder space 7, and piston 16 diametrically opposite it in a cylinder space 14. Each of the pistons 15 associated with the member 2—3, has associated with it a thrust rod 17, three of which are shown in section in Fig. 2. These rods 17 extend through appropriate guiding apertures 18 in the member 2—3.

Similarly, each of the pistons 16 associated with member 2—3 cooperates with a thrust rod 19, guided in an aperture 20 formed in the member 2—3. Fig. 2 indicates that the axes of all of the fourteen cylinder spaces, and that all of the fourteen piston structures are equiangularly disposed about the axis 1, the cylinder chambers in member 2 alternating with the cylinder chambers in member 3.

The rods 17 and 19 are not joined to the pistons 15 and 16. Instead, they operatively contact the inner ends of these pistons. In this way, accurate concentricity between any piston 15 and its associated stem or rod 17 is not essential; and machining operations are therefore easily performed.

Figure 4:
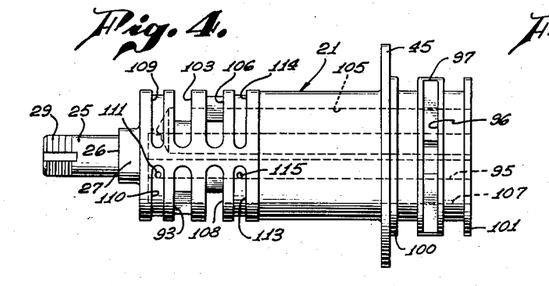
Fig. 4 is a plan view of a central stationary pintle upon which the rotating parts of the apparatus are mounted.
Figure 5:
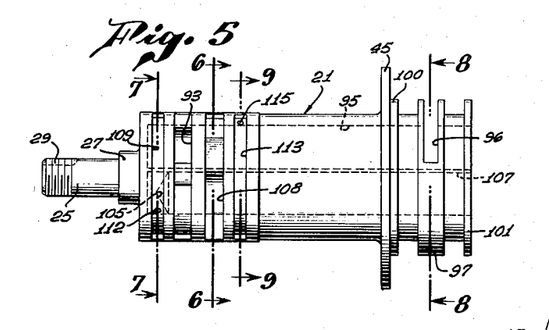
Fig. 5 is a side view of the pintle.
Figure 6:
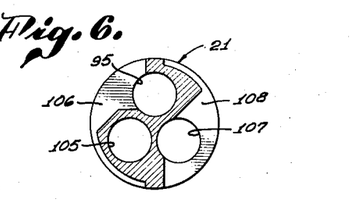
Figs. 6, 7, 8 and 9 are detail sectional views taken along planes respectively corresponding to lines 6—6, 7—7, 8—8 and 9—9 of Fig. 5.

The member 2—3 is journalled directly upon the pintle 21. Member 2 in addition, has an integral sleeve 22. This sleeve, as shown most clearly in Fig. 1, extends towards the left and serves as a support for the outer race 23 of a radial ball bearing structure B. The inner race 24 is mounted upon a reduced portion 25 of the pintle 21. This inner race is urged tightly against a shoulder 26 formed by a boss 27 at the left hand end of the pintle 21 (see, also, Figs. 4 and 5). In order to hold the inner race 24 in its position, use is made of a nut 28 engaging the threaded extremity 29 of the pintle 21. A lock washer 30 is interposed between the nut 28 and the inner race 24 in a conventional manner for preventing inadvertent rotation of the nut 28.

The extreme left-hand end of the sleeve 22 is internally threaded for the accommodation of a threaded ring 31. The right-hand side of this threaded ring engages a flange 32 formed on a splined sleeve 33. This flange 32 urges the outer race 23 against an appropriate internal shoulder formed at the right-hand portion of the sleeve 22.

The sleeve 33 is hollow and provided with internal splines for the accommodation of a splined shaft 34 for driving the cylinder block 2—3.

In order to form a sealed enclosing casing for the apparatus, a hollow cylindrical housing 35 is formed integrally with an end cover 36. This end cover 36 is provided with a conventional oil seal structure 37 incorporating a fluid seal 38.

The right-hand end of the hollow cylindrical member 35 telescopingly engages over a flange 39 formed in a cover member 40. A sealing O-ring packing 41 is shown as disposed in a groove in the flange 39. Machine screws 42 (Fig. 3) serve to attach the cover member 40 to the member 35.

In order to form inlet and outlet passages for the pump there is provided an internally threaded boss 43 on cover 40 and an inclined internally threaded boss 44 both extending outwardly of the member 40. The boss 43 serves to provide an inlet connection I and the boss 44 similarly serves to provide an outlet connection O.

The pintle 21 is supported upon the cover member 40 by the aid of a flange 45 integral with the pintle 21, and disposed in a recess 46 in cover member 40. A plurality of machine screws 47 pass through the flange 45 and are threaded into the cover member 40 for firmly attaching the pintle 21 to the cover member.

For causing reciprocation of the pistons 15 within their respective cylinder bores or spaces, use is made of reaction rings having inclined surfaces in contact with the pistons 15, 16 and the stems 17, 19. This mode of reciprocation by the aid of "wobble plates" is well known. In the present instance, there is a "wobble plate" opposite each end of the cylinder block structure 2—3.

Considering first the left-hand inclined member 48, this member is shown as having an inner flange 49. The end surface 50 (Fig. 1) of this flange forms an inclined surface hereinabove referred to. This surface 50 is a surface of revolution about an axis 72. It contacts the convex outer end of the pistons 15 as well as the convex outer ends of stems 19. A similar reaction ring 51 opposite the right-hand side of the cylinder block is provided. It has a flange 52 providing an inclined surface 53 contacting the convex ends of pistons 15 and stems 17. This surface 53 is also a surface of revolution about axis 72. The surfaces 50 and 53 in this instance are shown as plane surfaces; but they could be curvilinear, so arranged that linear elements of the two surfaces at diametrically opposite points with respect to axis 72 are parallel.

The rods 17 and 19 are of such length that there is no appreciable lost motion between these rods and the respective pistons 15 and 16.

Assuming that the surfaces 50 and 53 remain at an adjusted definite inclined position, the pistons 15, 16 will be reciprocated when the cylinder block 2—3 is rotated. Thus the piston 15 is shown in Fig. 1 as in its extreme left-hand or outermost position. Corresponding to a half-revolution of planetary movement of this piston about the axis 1, this piston is urged inwardly of its cylinder space 7. Accordingly, the piston 15 at the instant shown in Fig. 1, is ready to begin its pressure stroke, and liquid will be urged into the outlet port in a manner to be hereinafter described.

After the piston 15 has reached its full discharge stroke, the next half-revolution of the block 2—3 will return it to the position shown in Fig. 1. This half-revolution corresponds to the intake stroke at which time the cylinder space is in communication with the inlet. Each of the pistons 15 in member 3 passes sequentially through the same cycle.

Similar considerations apply in connection with the pistons 16 provided in the cylinder block member 3.

In order to provide a compact apparatus, the flanges 49 and 52 of the reaction members 48 and 51 are telescoped within grooves 54 and 55, disposed respectively in the end surfaces of member 2—3. These grooves 54 and 55 thus make it possible to maintain a sufficiently long axial guide for the pistons 15 and 16.

The members 48 and 51 are rigidly joined together. This is accomplished in any desired manner. In the present instance the connection between these members 48 and 51 is effected by a hollow cylindrical member 56 threaded at each end for the accommodation of the threaded flanges 57 and 58 of the members 49 and 51. The flanges 57 and 58 abut annular shoulders formed within the cylindrical member 56.

Furthermore, these members 48 and 51 are mounted for free rotation so as to eliminate as much sliding friction as possible between the inclined surfaces 50 and 53 and the ends of the pistons and their thrust rods. For this purpose the member 48 is provided with a flange 59 extending toward the left, upon which is force-fitted the inner race 60 of a ball bearing structure 61. The outer race is accommodated within a ring 62.

A similar arrangement is provided for the member 51, including a flange 63, inner and outer races 64 and 65, and ring 66. These rings are joined together by the aid of an outer cylindrical member 67 threaded at its ends and engaging external threads on the rings 62 and 66. Snap rings 68 and 69 within member 67 serve as abutments for confining the outer races 63 and 65.

The degree of tilt or inclination of the surfaces 50 and 53 may be adjusted to vary the displacement of the pistons. For this purpose, the outer cylindrical member 67 is shown as mounted for angular movement by the aid of diametrically opposite bearing extensions 70 and 71 (Fig. 2).

The axis 72 of these bearing extensions 70, 71 is normal to the axis 1 and substantially centrally of the cylinder block 2—3. Stationary bearing members 73 and 74 provide a pivotal support for the member 67. These bearing members 73 and 74 are formed as inwardly directed extensions or posts 75 and 76. These posts extend into apertures formed in the casing 35 and are attached to the casing by the aid of flanges 77 and 78. O-rings 79 and 80 serve to maintain the seal of the casing intact. Since the spacing between the inclined surfaces 50 and 53 is fixed at all times, it is essential that in spite of this angular adjustment, the pistons 15 and 16 and the stems or rods 17 and 19 contact these surfaces. For that reason, the convex spherical surfaces at the contacting ends of these elements have a common center.

Depending from the lower side of the member 67 is an operating arm 81. This operating arm extends into a recess 82. Transversely of the recess and engaging opposite sides of the operating arm 81 are the hydraulically controlled pistons 83 and 84. These pistons operate in bores 85 and 86 in communication with ports 87 and 88. Either of these ports may be provided with fluid pressure in which event the other port is connected to exhaust. In this manner, a simple remote control system is provided for moving the arm 81 and thereby causing adjustment of the angular position of the reaction members 48 and 51.

The position of the members 48 and 51 is illustrated in Fig. 1 at their extreme counter-clockwise adjustment. Angular movement in a clockwise direction about axis 72 serves first to reduce the volumetric capacity, and then to reverse the positions of the pistons. To cause the apparatus to function as a pump, a reverse direction of rotation is required, or it will pump out of opposite passages.

Any leakage of oil into the housing 35 may be drained off by the aid of an appropriate plug 89 (Fig. 3).

Valving for the mechanism is obtained by the aid of ports 90, 91 at the bases of the cylinder spaces 7 to 14 provided for the pistons 15 and 16. These ports, as shown most clearly in Fig. 2, are radial, and are formed by appropriate radial drilling from the exterior of the block 2—3. The outer ends of these ports 90 and 91 are closed by a sleeve 6, shrunk upon the block 2—3.

Assuming a clockwise rotation, as indicated by arrow 92 of Fig. 2, the pistons in the bores 7, 8, 9 and 10 will be urged inwardly of their bores because of the slope of the surface 50. For the instant shown in Fig. 2, piston 15 in bore 7 will begin to move inwardly upon such clockwise rotation; three other pistons 15 respectively in bores 8, 9 and 10 have already begun their inward movement. The cylinder spaces 8, 9 and 10 are in communication with the outlet O of the apparatus, and the cylinder space 7 is just on the verge of also being placed into communication with the outlet.

This outlet communication is effected by the aid of a groove 93 extending for almost 180° on the periphery of the pintle 21. At an intermediate place, this groove is deepened as by appropriate plane surfaces 94 (Fig. 2) to communicate with a port 95 extending longitudinally of pintle 21. This port 95 is also shown in Figs. 6, 7, 8 and 9. It is placed in communication with the outlet O by the aid of a slot 96 (Figs. 1 and 5) formed in a cylindrical flange 97 of pintle 21. This slot is in communication with a port 98 (Fig. 1) opening into the outlet passage O. A plug 99 (Fig. 1) seals the righthand end of the port 96 and is attached as by welding.

The pintle 21 is provided with additional flanges 100 and 101, forming with the flange 97 appropriate annular grooves for the reception of sealing O-rings 102.

The pistons 15 located in the cylinder spaces 11, 12 and 13 are connected to the inlet I at the instant shown in Fig. 2. This is effected by the aid of the annular groove 103 (Fig. 2) located diametrically opposite from the groove 93 and similarly shaped. This groove is deepened by the aid of the surfaces 104 to communicate with a longitudinally extending port 105, located in the pintle 21, and in direct communication with inlet I (see also, Figs. 4, 5, and 6).

Corresponding inlet and outlet grooves are provided for the cylinder chambers 14 formed in the cylinder block member 3. Thus groove 106 having an angular extent of substantially 180°, is in communication with the outlet port 95. The lowermost piston 16 at the instant illustrated in Fig. 1 is at its extremely extended position. Movement of 180° of the cylinder block 2—3 will cause this piston 16 to move inwardly. Accordingly, the port 91 of this lowermost piston 16, as well as of those disposed in clockwise advance of this lowermost piston, are connected by the aid of their ports 91 to this outlet groove 106. The other pistons in block member 3 are connected to the inlet groove 108 that is in constant communication with longitudinal port 107 in the pintle 21. This port 107 parallels the port 105 and opens into inlet I.

Figure 10:
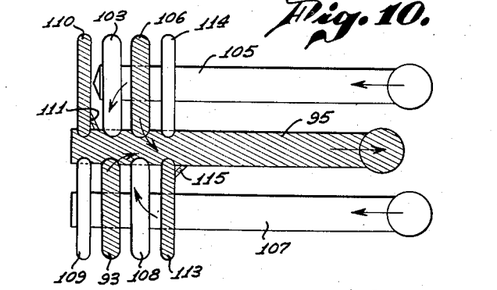
Fig. 10 is a diagram illustrating the manner in which compensating pressure chambers are formed in combination with the inlet and outlet ports of the apparatus.

The diagrammatic arrangement shown in developed form of the ports just discussed is illustrated in Fig. 10. The grooves 93 and 106 forming the outlet ports are shown shaded, and as in communication with the outlet longitudinal port 95. The grooves 103 and 108 diametrically opposite the grooves 93 and 106 respectively are shown as in communication respectively with the ports 105 and 107. As viewed in Fig. 10, accordingly, due to the preponderance of pressure in the ports 93 and 106, the cylinder block structure 2—3 is subjected to liquid pressure, tending to cock it in a counter-direction about an axis normal to axis 1.

Figure 7:
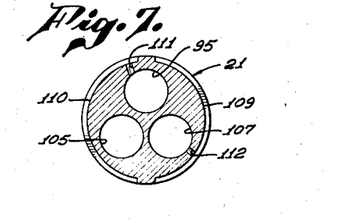
Figure 8:
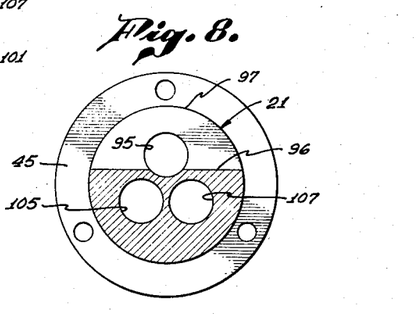
Figure 9:
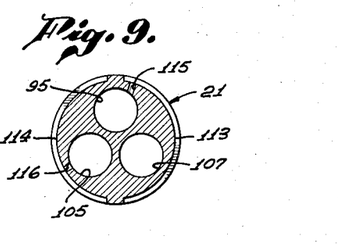

Such a cocking action can be compensated for by the aid of a plurality of compensating grooves. Thus the pintle 21 has a pair of diametrically opposite grooves 109 and 110, arranged to the left of grooves 93 and 103. The groove 110 is connected as by the aid of a small port 111 to the outlet port 95, and is accordingly subjected to outlet pressure (Fig. 7). The groove 109 is in communication with inlet port 107 by the aid of the vent or port 112 (see, particularly, Fig. 7). An additional pair of balancing grooves 113 and 114 (Fig. 9) are located to the right of the grooves 106 and 108. Groove 113 is connected to the outlet port 95 by the aid of the opening or vent 115; and the groove 114 is connected as by the aid of the vent 116 to the inlet port 105. By appropriate proportioning of the areas of the grooves 109 and 110 and 113 and 114, the forces produced by the liquid in these grooves, upon block 2—3, serve to compensate for the cocking action.

The compensating torque produced by the liquid pressure in the passage or ports 109, 110, 113 and 114 can be supplemented to compensate as well for the cocking torque produced upon the cylinder block 2—3 by the reaction of pistons and stems against the members 48 and 51. This may be explained in connection with Fig. 12.

Figure 12:
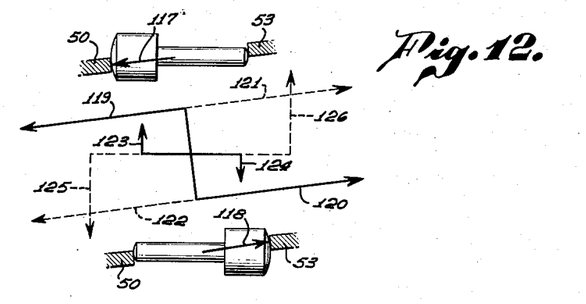
Fig. 12 is a diagram indicating the major forces and their reactions encountered by the cylinder block and the bearing structures.

The arrows 117 and 118 represent respectively the force exerted by an individual piston against the corresponding inclined surface 50 or 53. The summation of all of these forces can be represented by the couple having the forces 119 and 120. An equivalent opposite couple corresponding to the force 121 and 122 represents the couple acting upon the cylinder block structure 2—3. The forces 123 and 124 represent the cocking effect of the pressures in the pintle ports upon the cylinder block, discussed hereinabove in connection with Fig. 10. A compensating torque, corresponding to the effect of the balancing fluid pressures in the balancing grooves 110, 111, 113 and 114 is represented by the couple having the forces 125 and 126. This last couple can be such as to neutralize substantially entirely the couples 121, 122, and 123, 124.

The forces operating upon the reaction members 48 and 51 impose a tensile stress in the cylindrical connecting members 56 and 67. No thrust force whatever is borne by the bearing structures 61.

Accordingly, the bearing structures 61 for the reaction members 48 and 51 are loaded only with a radial force, the thrust forces being sustained by the members 56 and 67. Relatively small, inexpensive bearings can be used. The same is true with respect to the bearing structure B for rotatably supporting the cylindrical block structure upon the pintle 21.

Figure 11:
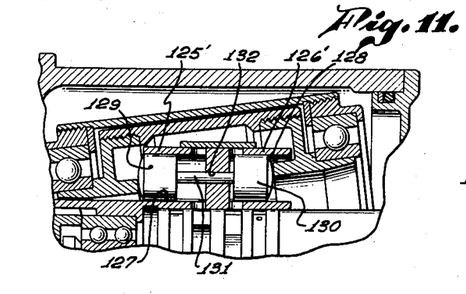
Fig. 11 is a fragmentary sectional view similar to Fig. 1, of a modified form of the invention.

In the form just described each cylinder space facing to the left (Fig. 1) does not have a corresponding cylinder space facing to the right, there being in all fourteen pistons. The number of pistons can be doubled, doubling the pump capacity, by the aid of the structure illustrated in Fig. 11. In this form, the cylinder block members 125′ and 126′ are of similar construction and have aligned cylinder spaces 127 and 128. In each of these spaces a piston structure 129 or 130 is located. A separate strut 131 communicating thrusts between these pistons is guided in an appropriate aperture 132 in the cylinder block member 125. This strut member 131 is not permanently connected to either of the pistons 129 or 130. The inlet and outlet ports can be arranged as before. The convex ends of both these pistons 129, 130 are spherical and have a common center. In other respects the structure is the same as that disclosed.

In the forms of the invention above described, the valving is effected by the aid of grooves formed in the pintle structure 21. The outer cylindrical periphery of the pintle provides a running fit for the inner diameter of the cylinder block. Leakage of the liquid to be pumped may therefore occur along a considerable portion of this periphery.

In order to minimize this leakage as much as possible, a form of valving is illustrated in Figs. 13 to 22, inclusive. In this form, the inlet and outlet ports are of the same general configuration as in the first form described, but they are disposed in collars either integrally formed on the pintle or securely attached thereto. In this way, a sealing can be effected against the sides of these collars in a more effective manner than in the form first described.

Figure 13:
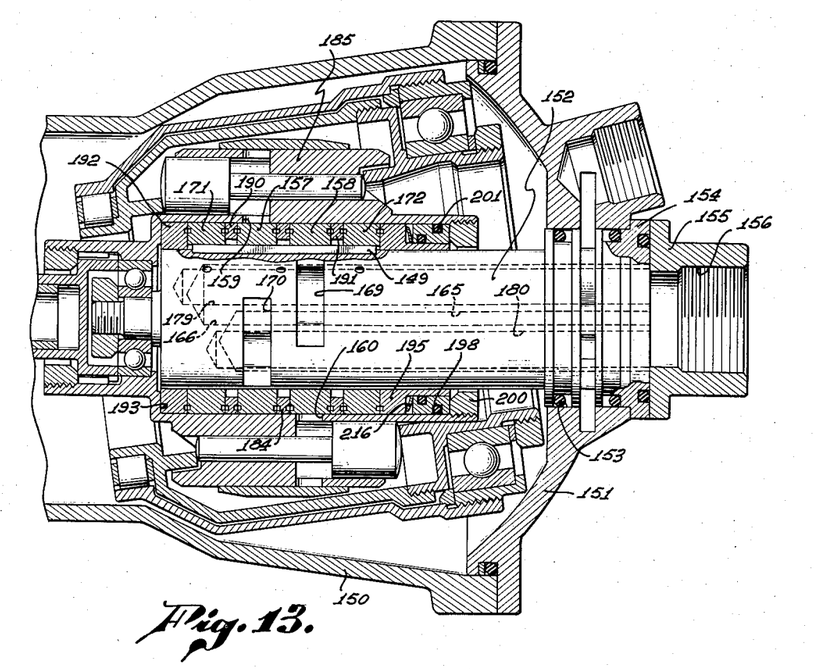
Fig. 13 is a view similar to Fig. 1 of a further modified form of the invention.

Thus, in Fig. 13 there is disclosed an outer casing 150 and a cover member 151 of the same general form as that disclosed in Figs. 1 and 2. In this instance, however, the pintle 152 is so arranged that it is insertable through the aperture 153 of the cover 151. The pintle 152 is provided with an extended integral collar 154, which is attached to the exterior surface of the cover 151. This holds the pintle 152 firmly in place. An inlet fitting 155 is attached to the right-hand surface of this collar 154 and provides an inlet passage 156 into longitudinal inlet ports within the pintle 152.

Keyed to the pintle 152 is a pair of collars 157 and 158. A key 149 is utilized for this purpose; the key permits axial movement of the collars. These collars provide inlet and outlet valves arranged to cooperate with the cylinder ports 159 and 160 (Fig. 13). Thus there are two diametrically opposite arcuate valve grooves 161 and 162 in the collar 157 (Figs. 15 and 16), and corresponding grooves 163 and 164 in the collar 158.

Figures 14, 15, 16, 17, 18, 19, 20:
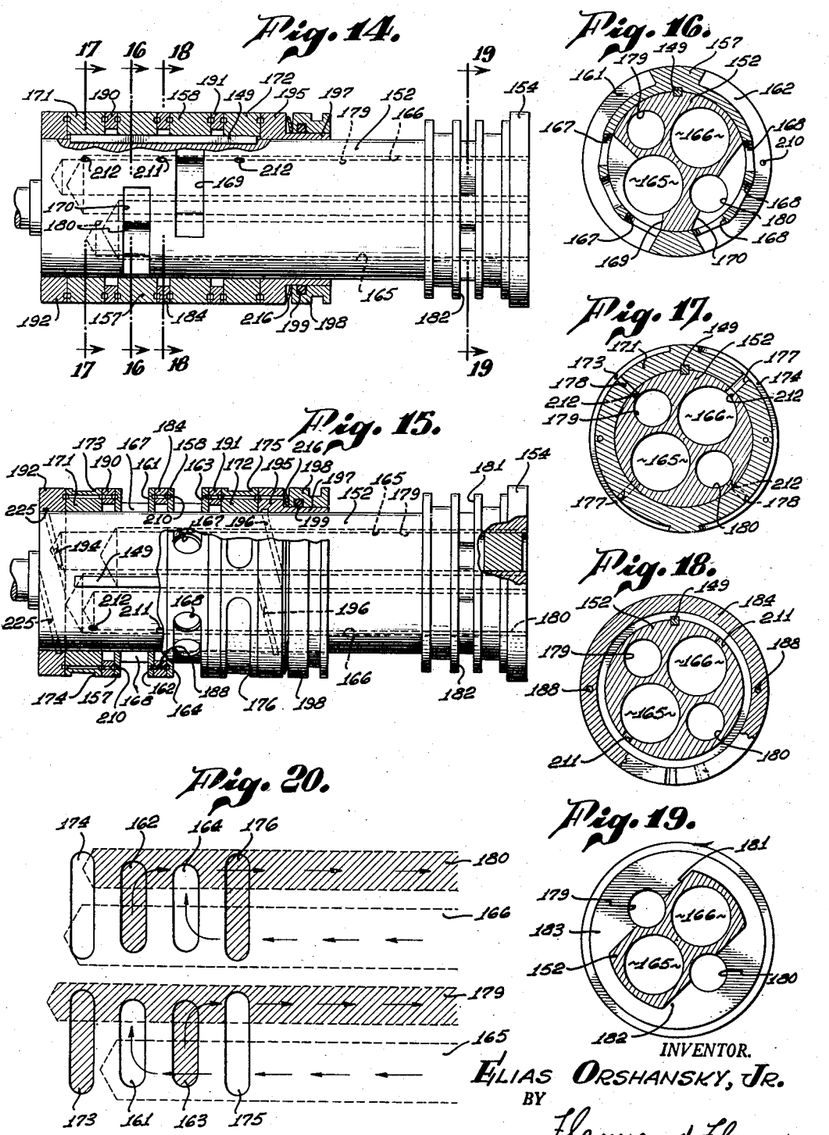
Fig. 14 is a side view of the central stationary pintle structure upon which the rotating parts of the apparatus shown in Fig. 13 are mounted, some of the parts being shown in section.
Fig. 15 is a plan view of the pintle structure shown in Fig. 14, with some of the parts shown in section.
Figs. 16, 17, 18 and 19 are sectional views taken along planes corresponding respectively to lines 16—16, 17—17, 18—18 and 19—19 of Fig. 14.
Fig. 20 is a diagram similar to Fig. 10 but corresponding to the form of the invention shown in Fig. 13.

As shown most clearly in Fig. 16, the pintle 152 has two longitudinally extending ports 165 and 166, which connect into the inlet aperture 156. Apertures such as 167 and 168 are formed in the collars communicating with the bottom of the ports 161 and 164 for passing the liquid to be pumped from the inlet apertures 165 and 166 to these ports.

The pintle 152 is provided with a converging recess 169 (see Fig. 16) that intersects the longitudinal port 165 to complete communication from the inlet to the inlet port 161 of collar 157.

A recess similar to 169 intersecting the longitudinal inlet port 166 is formed in the pintle 152 to cooperate with the inlet groove port 164 in the valve collar 158. The recess 169 that cooperates with the inlet port of collar 158 is shown in Fig. 14. That recess 169 which cooperates with the collar 157 is diametrically opposite the recess 169, shown in Fig. 14 but axially spaced toward the left to cooperate with the inlet groove 161.

The pintle 152 is also provided with slots 170 intersecting respectively the outlet ports 179 and 180 in the pintle 152. One of these slots 170 is shown in Figs. 14 and 16 cooperating with the outlet groove valve of collar 157. A diametrically opposite slot 170 axially spaced to cooperate with collar 158 is also provided.

Two additional collars are used, keyed by key 149 to the pintle 152. The left-hand collar 171 is axially spaced from the left-hand side of the ported collar 157. The other collar 172 is axially spaced from the right-hand side of the ported collar 158.

Collar 171 is provided with annular arcuate diametrically opposite balancing grooves 173 and 174 (see particularly Fig. 17). Collar 172 is similarly provided with the balancing grooves 175, 176. Grooves 174 and 175 are respectively connected to the input longitudinal ports 166 and 165, as by radial apertures, such as 212 and 177 (Fig. 17). The balancing grooves 173 and 176 are connected as by radial apertures such as 212 and 178 (Fig. 17) to the longitudinally extending output ports 179 and 180. The arrangement is disclosed diagrammatically in Fig. 20, which is similar in its balancing effect to the spaces and ports shown in Fig. 10.

As shown most clearly in Fig. 19, the output ports 179 and 180 communicate with slots 181 and 182 provided in a flange 183 of the pintle 152.

Figure 21:
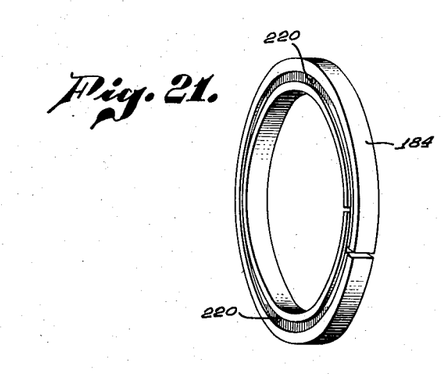
Fig. 21 is a pictorial view of one of the links or collars utilized in connection with the form of the invention shown in Fig. 13.
Figure 22:
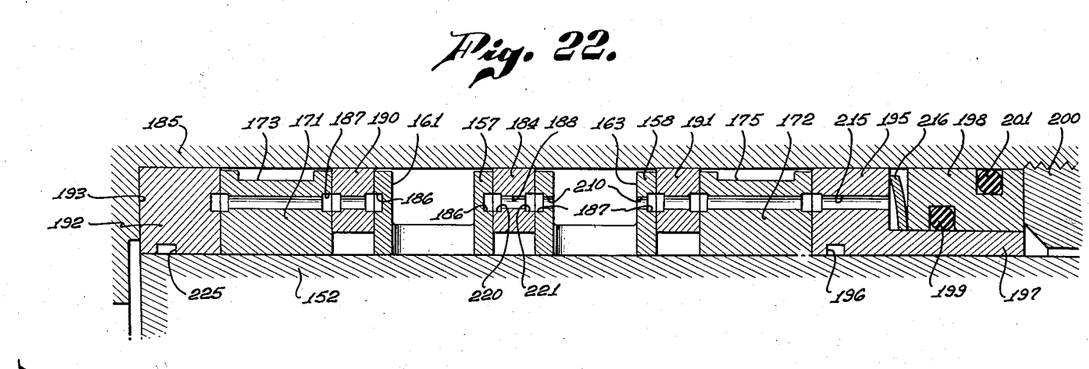
Fig. 22 is an enlarged cross-sectional view similar to Fig. 14, some of the clearances being exaggerated.

Intermediate the two valve collars 157 and 158 is disposed a ring or collar 184 (see, also Figs. 18 and 22). This ring or collar is fitted tightly within the cylinder block 185 of similar construction to the cylinder block 2—3 of Fig. 1. If desired, this ring may be split similarly to a piston ring to permit it to expand and remain in firm contact with the cylinder block upon variations in temperature or deflection of the cylinder block. A pictorial illustration of this split ring 184 is shown in Fig. 21.

The adjacent facing side of the valve collars 157 and 158 are provded with annular grooves 186 and 187 in communication with corresponding annular grooves 220 and 221 on opposite faces of the ring 184. All of these annular grooves remain in communication as by the aid of the ports 188 (Fig. 18), and serve to exert an expanding force against the collars 157 and 158. This expanding force is due to the passage of high pressure fluid into these grooves by way of a port 210 (Figs. 15 and 16) in collar 157, as well as by way of a similar port 210 (Fig. 15) in collar 158. These ports 210 connect the respective outlet groove ports 162 and 163 with the annular grooves 186 and 187. Any leakage between the contacting faces finds its way radially inwardly of ring 184, which has clearance with pintle 152. This clearance is shown exaggerated in Fig. 22. As shown in Fig. 18, this leakage may be returned to the inlet ports 165 and 166 as by ports 211.

A similar ring 190 is interposed between the balancing collar 171 and the valve collar 157. These also have face grooves similar to grooves 186 and 187. They receive high pressure through similar ports 210 leading to the high pressure groove valves 162 and 163. Another ring or collar 191 is similarly interposed between the right-hand face of valve collar 158 and the balancing collar 172, having grooves receiving pressure through the ports 210.

In order to urge all of these collars and rings into axial engagement, use is made of an end collar 192 abutting a shoulder 193 of the cylinder block 185 (Fig. 13). This end ring 192 is provided with a helical groove 225 on its inner surface which may be placed in communication with the outlet port 179 as by an aperture 194. This provides lubrication between the relatively moving parts. The right-hand surface of this ring provides a seal against collar 171. The ring 192 being tight in the cylinder block 185 serves as a bearing for this block on pintle 152. Other types of bearings may be used.

A similar end collar 195, also provided with a lubricating groove 196, is placed adjacent the right-hand surface of the balancing collar 172. This collar 195 is also rotatable with the cylinder block 185 and also forms a pintle bearing. It has at its right-hand side an integral sleeve member 197, having running clearance on the pintle 152. A grooved ring 198 is mounted over the sleeve 197 and sealed as by the aid of an O-ring 199. A ring 200 (Figs. 13 and 22), threads into the bore of the cylinder block 185 and serves to hold this ring 198 in place. An O-ring 201 is disposed in the external groove of this ring 198 for sealing purposes.

It is noted that there is a narrow space between rings 195 and 198. This narrow space communicates with high pressure fluid that fills the annular grooves hereinabove referred to. This communication is effected by one or more ports 215 extending through the ring 195.

As hereinabove stated, the rings 192, 190, 184, 191, 195 and 198 are rotatable with the cylinder block. Rings 192 and 195 provide bearing surface clearance upon the pintle 152. Accordingly, the collars 171, 157, 158 and 172 may have sufficient clearance with the interior of the cylinder block to permit proper circulation of oil and to prevent seizure.

The high fluid pressures existing in the annular grooves such as 186 and 187 and their matching grooves 220 and 221 serve to equalize the pressures upon the collars and rings so as to reduce appreciably any cocking action of these rings and collars with respect to the pintle 152. The pressure existing in the space between rings 195 and 198 acts over an area sufficiently large so as to urge all of the rings and collars to the left of ring 198 against the right-hand surface of the ring 192, and finally against the shoulder 193. To provide initial pressure, a spring washer 216 is interposed between the rings 195 and 198.

The control of the displacement may be of the same form as shown in Figs. 1 and 2.

The inventor claims:

1. In hydrodynamic apparatus: a cylinder block, there being cylindrical spaces formed in said blocks by cylindrical surfaces, said surfaces having parallel axes, and angularly spaced about an axis of rotation of the cylinder block; a non-rotary support for the block and providing an axis of rotation therefor; pistons in said spaces; and a pair of reaction members, each having a surface inclined to the axis of rotation, said surfaces being parallel and operating pistons at each side of the block; said non-rotary support having diametrically opposite arcuate inlet and outlet ports adapted to communicate with the cylinder spaces; said block and non-rotary support having cooperating surfaces defining arcuate spaces that are diametrically opposite each other and fixed with respect to the non-rotary support; one arcuate space being in constant communication with the inlet, and its angular position with respect to the axis substantially corresponding to the angular position of the arcuate outlet port; the other arcuate space being in constant communication with the outlet, and its angular position with respect to the axis substantially corresponding to the angular position of the arcuate inlet port, for reducing the tilting effect upon the block, of the hydraulic pressures impressed upon the block.

2. In hydrodynamic apparatus: a cylinder block, there being cylindrical spaces formed in said block by cylindrical surfaces, said surfaces having parallel axes; a stationary pintle for rotatable supporting said block; each of the cylinder spaces having a radially inwardly directed port; a piston operating in each cylinder space; means for reciprocating said pistons as the block is rotated; a collar attached to the pintle and having arcuate inlet and outlet ports cooperating with the cylinder ports; said pintle having corresponding longitudinally extending ports in constant communication with said collar ports; and collars carried by the block and disposed on each side of the collar; the collars carried by the block having surfaces in contact with the opposite sides of the collar attached to the pintle; the adjacent surfaces between the collar attached to the pintle and the collars carried by the block having communicating annular grooves.

3. In hydrodynamic apparatus: a cylinder block, there being cylindrical spaces formed in said block by cylindrical surfaces, said surfaces having parallel axes; a stationary pintle for rotatably supporting said block; each of the cylinder spaces having a radially inwardly directed port; a piston operating in each cylinder space; means for reciprocating said pistons as the block is rotated; a collar attached to the pintle and having arcuate inlet and outlet ports cooperating with the cylinder ports; said pintle having corresponding longitudinally extending ports in constant communication with said collar ports; and a pair of supplemental collars carried by the pintle and axially spaced from the said collar, and having arcuate peripheral recesses corresponding to the arcuate ports; some of the recesses being in communication with the pintle outlet port, and the other recesses in communication with the pintle inlet port; the pressures in said ports being arranged to compensate for the tilting effect of the hydraulic pressures in the cylinders and the ports in the said first collar.

4. In hydrodynamic apparatus: a cylinder block, there being cylindrical spaces formed in said block by cylindrical surfaces, said surfaces having parallel axes; a stationary pintle for rotatably supporting said block; each of the cylinder spaces having a radially inwardly directed port; a piston operating in each cylinder space; means for reciprocting said pistons as the block is rotated; a collar attached to the pintle and having arcuate inlet and outlet ports cooperating with the cylinder ports; said pintle having corresponding longitudinally extending ports in constant communication with said collar ports; a pair of supplemental collars carried by the pintle and axially spaced from the said collar, and having arcuate peripheral recesses corresponding to the arcuate ports; some of the recesses being in communication with the pintle outlet port, and the other recesses in communication with the pintle inlet port; the pressures in said ports being arranged to compensate for the tilting effect of the hydraulic pressures in the cylinders and the ports in the said first collar; and collars carried by the cylinder block and respectively disposed between the pintle collar and the supplemental collars, said block collars having side surfaces in contact with the adjacent side surfaces of the collars carried by the pintle; the said side surfaces having communicating annular grooves.

5. In hydrodynamic apparatus: a rotary cylinder block; a non-rotary pintle for the block and providing an axis of rotation therefor; there being cylindrical spaces formed in said block cylindrical surfaces, said surfaces having axes parallel to the axis of block rotation; an equal number of cylinder spaces opening on each side of the block, said cylinder spaces being equiangularly spaced about the block axis; pistons in each of the spaces; reaction members each having a surface inclined to the axis of rotation and operating said piston; said inclined surfaces being parallel; a pair of axially spaced collars mounted on the pintle and each having diametrically opposite arcuate inlet and outlet ports; those cylinder spaces opening on one side of the block having ports adapted to cooperate with the ports of one collar, and the other cylinder spaces with the ports of the other collar; supplemental collars mounted on the pintle and axially spaced so that the ported collars are between the said supplemental collars; the adjacent side surfaces of the ported collars and the supplemental collars being axially spaced, whereby three intermediate spaces are formed; three spacing collars carried by the block and disposed in said intermediate spaces; a pair of end collars respectively adjacent the outer side surfaces of the supplemental collars, and carried by the block; side surfaces of all of the collars having annular registering grooves, the opposite grooves on opposite sides of all but the end collars being in constant communication; each of said supplemental collars and the block defining walls forming diametrically opposite arcuate spaces respectively in communication with the inlet and outlet ports for reducing the tilting effect of fluid pressure upon the block.

6. In hydrodynamic apparatus: a rotary cylinder block; a non-rotary pintle upon which the block is rotatably supported; a series of axially spaced collars mounted on the pintle and restrained against relative angular movement with respect to the pintle; a series of collars carried by the block and interleaving with the pintle collars; at least some of the pintle collars having ports cooperating with ports in the cylinder block; at least two of the block collars serving as a bearing for the block; said block collars including two end collars adjacent the end collars of the pintle; and means for utilizing the outlet pressure of the apparatus for urging all of the collars toward each other; there being annular grooves in adjacent faces of the collars and connected to the outlet ports of the ported pintle collars.

7. In hydrodynamic apparatus: a rotary cylinder block; a non-rotary pintle upon which the block is rotatably supported; a series of axially spaced collars mounted on the pintle and restrained against relative angular movement with respect to the pintle; a series of collars carried by the block and interleaving with the pintle collars; at least some of the pintle collars having ports cooperating with ports in the cylinder block; at least a pair of other pintle collars each having a pair of peripheral grooves respectively connected to the pintle inlet and outlet ports, said grooves being so arranged as to provide balancing pressures to reduce tilting of the block; at least two of the block collars serving as a bearing for the block; said block collars including two end collars adjacent the end collars of the pintle; and means for utilizing the outlet pressure of the apparatus for urging all of the collars toward each other; there being annular grooves in adjacent faces of the collars and connected to the outlet ports of the ported pintle collars.

References Cited in the file of this patent

UNITED STATES PATENTS

| | | |
|---|---|---|
| 1,180,190 | Robertson | Apr. 18, 1916 |
| 1,634,867 | Borletti | July 5, 1927 |
| 2,229,715 | Zimmermann | Jan. 28, 1941 |
| 2,331,694 | Jeffrey | Oct. 12, 1943 |
| 2,420,806 | Anderson | May 20, 1947 |
| 2,601,830 | Berlyn | July 1, 1952 |
| 2,611,318 | Wahlmark | Sept. 23, 1952 |
| 2,662,375 | Postel | Dec. 15, 1953 |
| 2,690,133 | Dodge | Sept. 28, 1954 |
| 2,703,054 | Heater | Mar. 1, 1955 |
| 2,741,188 | Wemhoner | Apr. 10, 1956 |

FOREIGN PATENTS

| | | |
|---|---|---|
| 96,422 | Italy | Oct. 2, 1922 |
| 326,748 | Germany | Oct. 2, 1920 |
| 550,917 | Germany | May 21, 1932 |
| 683,558 | France | Mar. 3, 1930 |